United States Patent [19]

Mrha et al.

[11] 4,205,432
[45] Jun. 3, 1980

[54] METHOD OF MANUFACTURING PLASTIC BONDED BATTERY PLATES HAVING CONTROLLED POROSITY

[75] Inventors: Jiri Mrha; Bohumil Braunstein, both of Prague; Bedrich Janousek, Kostelec nad Labem; Jiri Jindra, Prague; Vojtech Koudelka; Jiri Malik, both of Mlada Boleslav; Zdeněk Zábranský, Prague, all of Czechoslovakia

[73] Assignee: Prazska akumulatorka, narodni podnik, Mlada Boleslav, Czechoslovakia

[21] Appl. No.: 874,360

[22] Filed: Feb. 1, 1978

Related U.S. Application Data

[63] Continuation-in-part of Ser. No. 745,202, Nov. 26, 1976, abandoned.

[30] Foreign Application Priority Data

Nov. 26, 1975 [CS] Czechoslovakia .................. 8010/75
Nov. 26, 1975 [CS] Czechoslovakia .................. 8011/75

[51] Int. Cl.² ........................ H01M 4/44; H01M 4/62
[52] U.S. Cl. .................................. 29/623.5; 429/217; 429/222

[58] Field of Search ............... 29/623.1, 623.4, 623.5; 264/104, 105; 429/222, 223, 217; 427/360, 365, 115, 123; 141/1, 1.1

[56] References Cited

U.S. PATENT DOCUMENTS

| | | | |
|---|---|---|---|
| 2,800,521 | 7/1957 | Olcott et al. | 429/241 |
| 3,007,991 | 11/1961 | Duddy | 264/104 |
| 3,009,979 | 11/1961 | Corren et al. | 429/217 |
| 3,184,339 | 5/1965 | Ellis | 29/623.4 |
| 3,238,058 | 3/1966 | Jeannin | 427/365 |
| 3,314,820 | 4/1967 | Smith | 29/623.4 |
| 3,477,940 | 11/1969 | Grangaard | 427/115 |
| 3,784,406 | 1/1974 | Kosta et al. | 427/115 |

*Primary Examiner*—Daniel C. Crane

[57] ABSTRACT

A method of manufacturing plastic bonded electrodes and battery plates, having a preselected porosity. The electrodes and battery plates are adapted for use in electro-chemical power sources. A loose active mass is mixed with a plastic material and a plasticizing and/or pore forming agent. The mixture is homogenized and thereafter rolled onto a metallic current collector so that a plastic skeleton is formed thereon or therein. The active mass then reacts with an electrolyte so as to act as a two-phase electrode.

5 Claims, 2 Drawing Figures

METHOD OF MANUFACTURING PLASTIC BONDED BATTERY PLATES HAVING CONTROLLED POROSITY

This application is a continuation-in-part of application Ser. No. 745,202, filed Nov. 26, 1976, now abandoned.

BACKGROUND OF THE INVENTION

The invention concerns a manufacturing method of plastic bonded electrodes for electrochemical power sources, such as batteries, wherein the plates have a controlled porosity. The manufacturing method includes a rolling step.

The rolling method of the invention is suitable for the manufacture of porous electrodes of batteries, especially for cadmium electrodes for alkaline batteries.

In the known methods for manufacturing such electrodes and plates, the active mass for the electrode is either enclosed in a perforated steel pocket or it is deposited in pores of a porous nickel body. In the first case the starting products for the manufacturing method is a prepressed longish rectangular briquette which is prepared by pressing the active mass; such briquettes are subsequently enclosed in perforated steel pockets that are thereafter coupled by welding to assume the form of electrododes of a desired shape. In the second case a porous nickel body, prepared by sintering a nickel powder, is several times impregnated by salt solutions of the electrochemically active metals which are subsequently precipitated in the form of hydroxides or oxides.

Further methods for preparing electrodes of the aforedescribed types are known from the literature. For example, in the method described in U.S. Pat. No. 3,009,980 (Nov. 21, 1961) a layer of a pasty active mass is deposited on the current collector by dipping; the liquid is removed by drying and the resulting semi-finished product is further treated by rolling.

A high labor consumption and the difficulty in attaining an optimum porous structure due to the use of a pasty active mass constitute important disadvantages of this known method.

A further known method (described in German Patent No. 1,187,698) for preparing plastic bonded electrodes, uses an electrochemically active material and two different resins. One of the resins serves as a pore forming agent which is removed by dissolving it after the electrode has been formed.

The main disadvantages of the last described known manufacturing method are the large labor consumption which is required and the necessity of extracting one resin from the electrode body.

The afore-described manufacturing methods, as described in the literature of the state of the art, are therefore not used in the mass production of electrodes of the aforedescribed type.

SUMMARY OF THE INVENTION

It is a general object of this invention to provide a manufacturing method for plastic bonded electrodes of the aforedescribed type wherein the disadvantages of the manufacturing methods of the state of the art are eliminated or at least minimized. In the manufacturing method of this invention a loose mixture of an active mass, plastics, a plasticizing agent or also a pore forming agent is homogenized. The resulting material is then rolled on a collector.

Under the term "pore forming agent" a substance is to be understood which, during the electrode manufacturing process, fills up the space of future pores and which is to be removed by evaporation, sublimation, dissolving, a chemical reaction, or in any other suitable way, after the electrode body has been prepared. Such pore forming agent may be either a solid or liquid substance such as, for example, oxalic acid, potassium chloride, ammonium chloride, ammonium oxalate, ethanol, benzene, toluene, or the like.

The term "plasticizing agent" implies a liquid substance which is designed for wetting the surface of plastic particles and, simultaneously, for reducing the friction of the plastic or other particles of the active mass. Consequently, a non-coherent active mass is capable of flowing or creeping if exposed to a pressure during the rolling process.

As wetting agents, all the organic solvents which are capable to wet polytetrafluoroethylene, such as, for instance, ethanol, petroleum, cyclohexanone, etc., are suitable to this purpose. Preferably, it is possible to combine the functions of a plasticizing agent and of a pore forming agent by using a liquid plasticizing agent which, on the one hand, improves the creep of the mixture to be processed in the rolling process and which, on the other hand, assumes the function of a pore forming agent. The added liquid acts as a pore forming agent; the amount of added liquid controls the porosity of the rolled material over broad limits and this liquid may be removed by a simple evaporation step at the end of rolling operation. The transfer of the specially prepared mass by rolling onto the current collector is carried out, for instance, so that one of the edges of the collector remains exposed and uncovered by the active layer and thus serves for making an electric connection.

The method of the invention is based on the knowledge that a loose mass exhibits a high flowability or ability to creep, which is required for the deposition at room temperature. This creeping or flowing action is obtained from a preparation of a mixture of pulverized electro-chemically active materials and materials suitable to be deposited by rolling procedure. The materials are wetted by a liquid plasticizing agent so that the mixture keeps its loose condition without, however, losing its capability of flowing when exposed to a pressure during the rolling process.

The plasticity of the mixture and consequently the rolling process is positively influenced by the presence of particles of bonding material exhibiting a suitable shape and size. The creep of the material is desirable especially for the preparation of an electrode having an active mass rolled onto the current collector which normally would prevent the creep of a pulverized material. By utilizing the afore-mentioned properties of materials an electrode having a uniform porosity and thickness can be prepared. Thus a favorable porous structure of an electrode made of an active material with a broad spectrum of grain size is obtained by the aforementioned method where the material is reinforced by the dispersed plastics so that it forms a solid skeleton of the electrode.

The manufacturing method for electrodes according to the invention, uses furthermore the recognized property that by addition of various amounts of liquid agents the final porosity of the electrode may be regulated, so that after the transferring the material by rolling, the liquid agent is removed in a simple way (for instance by evaporation). The thus obtained electrode functions in an alkaline electrolyte as a two-phase electrode where at the same time the contact area of both phases, namely the liquid electrolyte and the solid electrochemically active material, may be optimized by means of the controlled porosity.

It is possible to form an optimum porous structure by adding to the initial mixture a further pore forming agent whose function consists in that during the preparation of the electrode it occupies the volume of the future pores. The pore forming agent is removed for instance by evaporation, dissolving, thermal decomposition, chemical or electrochemical reaction in the cell during the manufacture or the putting into operation of electrodes.

The rolling of the electrodes may be also performed between heated rollers; or it is possible to perform the rolling in two stages: in the first stage the rolling is carried out between unheated rollers, and in the second stage the rolling is carried out between heated rollers. A melting down of a part of the plastic, a more stable bonding with the active mass, and the sintering together of the particles is effected by heating the mass to a suitable predetermined temperature.

The advantage obtained by the method for manufacturing electrodes of this invention resides in the considerable saving of labor consumption and the optimalized porous structure obtained by the method. The electrodes made in accordance with the method of this invention have a practically time constant capacity; may be made with a reduced amount of the active mass; the active mass is consumed with greater efficiency; the electrodes can absorb a higher current load. These circumstances are conditioned by an increase of the contact area of the porous electrode with a liquid electrolyte.

The electrodes according to the invention are therefore especially suitable for electrochemical power sources having a large specific energy.

In order that the method of the invention may be better understood and carried into practice, some preferred embodiments thereof will now be described with reference to the accompanying drawings which, however, are not intended to limit in any way the invention scope.

IN THE DRAWINGS

DESCRIPTION OF PREFERRED EMBODIMENT

Figure 1:
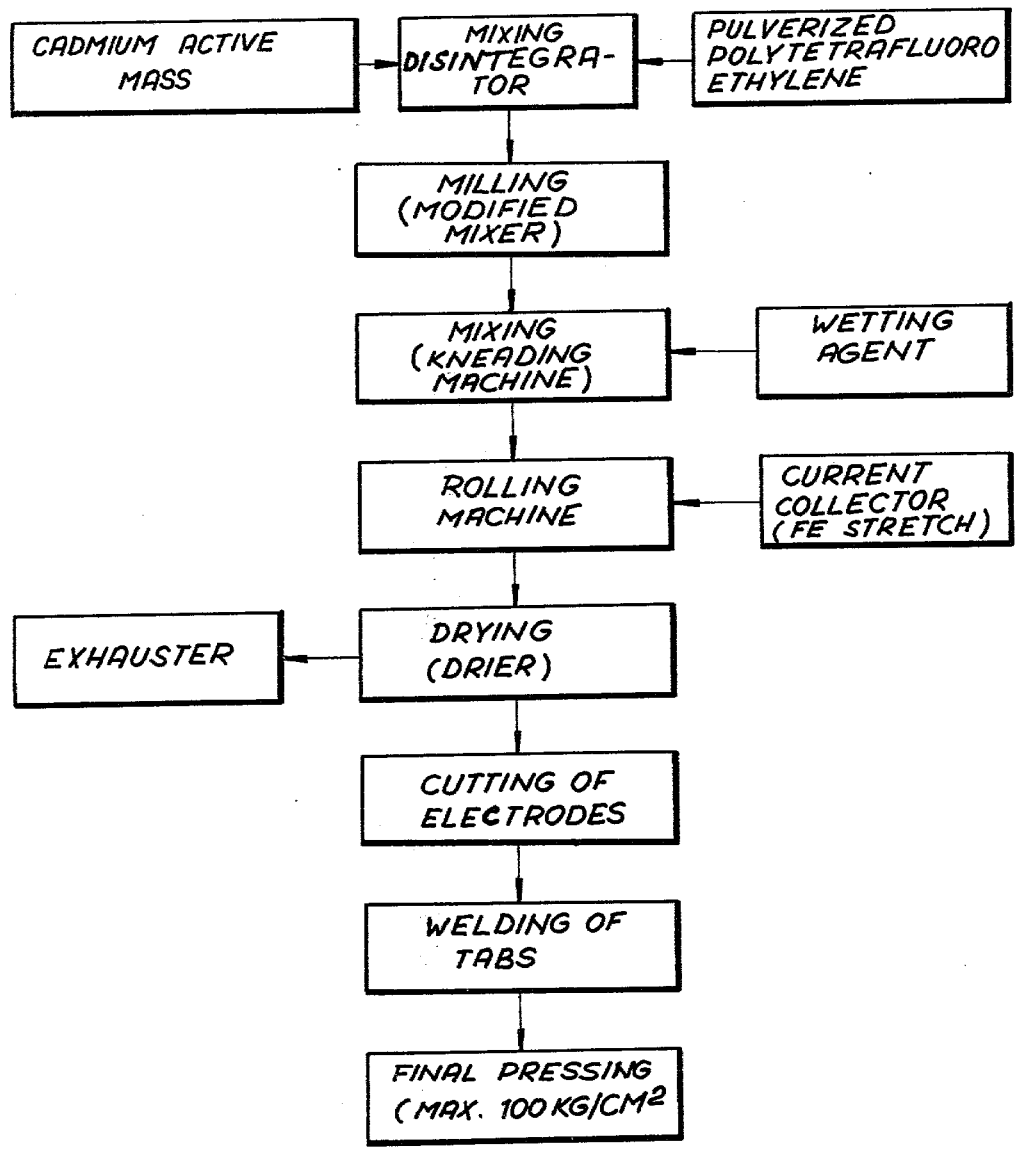
FIG. 1 is a flow chart of a method in accordance with the invention.

FIG. 1 illustrates the sequence of the various steps of the method of the invention.

Figure 2:
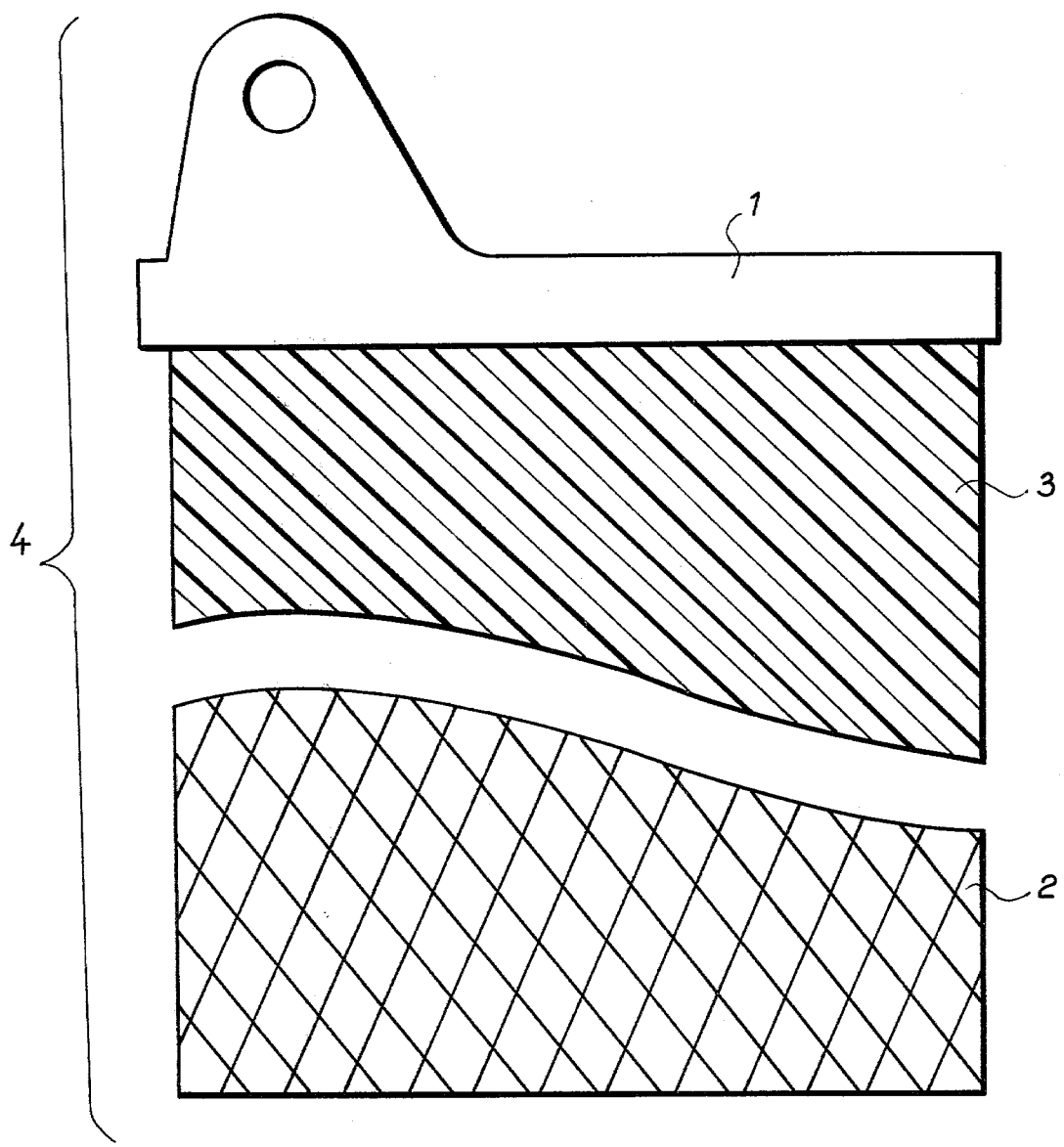
FIG. 2 is a schematic exploded view of an electrode made in accordance with the method of the invention.

FIG. 2 illustrates schematically an electrode or battery plate 4, which comprises a current collector grid 2 made of a Fe based stretch metal. The grid 2 is covered with an active mass 3 shown mirror-reversed. A tab 1 is welded to the grid 2.

The advantages of the manufacturing method will be best shown in practical examples of using the invention; however, the invention is in no way limited to the examples.

EXAMPLE NO. 1

4.5 parts of a pulverized active cadmium mass is thoroughly mixed in a disintegrator with 0.5 parts of pulverized polytetrafluoro ethylene of a suitable type; then one part of the ethyl alcohol is added during constant stirring. The resulting mixture is freely deposited on the current collector made of an iron stretch metal whose thickness and size of the mesh is regulated by the desired thickness of the electrode. The mixture deposited on the collector passes between two rotating parallel rollers adjusted to the desired thickness of the electrode. The resulting strip is exposed to the air and following the evaporation of the liquid agent it is cut to the desired size for the electrode. A contact tab is welded or bonded to the current collector 2 following the removal of the active mass from one edge of the stretch metal.

EXAMPLE NO. 2

The preparation of the mixture and the rolling process is carried out similarly as in the example 1. The prepared strip is dried at an increased temperature so that at the same time the vapors of the liquid agent are recycled by being reverse condensed, exhausted and used anew. The electrode strip is further processed as in example No. 1.

EXAMPLE NO. 3

The preparation of the mixture is performed as in example No. 1. The subsequent rolling is performed so that one of the edges of the current collector is exposed, that is left without the active mass during the rolling operation. The subsequent processing will be performed as in the examples Nos. 1 or 2.

EXAMPLE NO. 4

A sheet is made of the mixture prepared according to example No. 1 between the rollers of a conventional rolling machine. This sheet is thereafter deposited on one or both sides of the current collector by being rolled in. The resulting electrode strip is further processed as in the examples Nos. 1 to 3.

EXAMPLE NO. 5

A mixture consisting of 4 parts of pulverized active cadmium mass and of one part of pulverized polytetrafluoro ethylene of a suitable type are prepared and there is added one part of ethyl alcohol. The mixture is freely deposited on the current collector for instance an iron stretch metal and is rolled onto the collector between two rollers that are heated to a temperature of 300° C.

EXAMPLE NO. 6

The mixture is prepared as in example No. 1 by using 4 parts of pulverized active cadmium mass and one part of pulverized polyethylene. The further processing is the same as in example No. 5 and the temperature of the rollers is kept within the temperature range of 100° to 170° C. according to the type of polyethylene used.

An electrode having a thickness 1.2 mm., prepared according to examples 1 to 3, retains during the cycling, after 1000 charge-discharge cycles, still 60% of the theoretical capacity (1 g. of the active mass corresponds to 0.3 Ah). The slope of the linear part of the current-voltage characteristic corresponds to 1 Ohm.$cm^2$.

Although the invention has been illustrated and described with reference to several preferred embodiments of the method of the invention, it is to be expressly understood that it is in no way limited to the disclosure of such preferred embodiments, but is capable of numerous modifications within the scope of the appended claims.

We claim:

1. A method of manufacturing plastic bonded electrodes and battery plates having a preselected porosity and being adapted for use in electrochemical power sources, wherein the electrodes and plates comprise an active mass which is reinforced by a porous plastic skeleton and a metallic current collector, comprising the steps of mixing a loose active mass and a plastic material in a first mixing step in a mixer, and in a subsequent, second mixing step adding a liquid plasticizing agent and mixing it with the previously formed mixture to form a slightly wetted powder loose mixture, homogenizing the slightly wetted powder loose mixture, and thereafter in a first rolling step rolling the slightly wetted powder loose mixture into sheet form at room temperature.

2. The method of manufacturing plastic bonded electrodes and battery plates, as set forth in claim 1, wherein the liquid plasticizing agent acts simultaneously as a pore forming agent.

3. The method of manufacturing plastic bonded electrodes and battery plates as set forth in claim 2, wherein in the second rolling step said mixture is rolled on a portion of said metallic current collector leaving thereby an exposed surface on said current collector, and comprising bonding a connector tab onto said exposed surface of the current collector.

4. The method of manufacturing plastic bonded electrodes and battery plates as set forth in claim 1, wherein an independent sheet adapted to be reshaped is obtained from the first rolling step of the mixture, and comprising mounting said sheet between a pair of current collectors and thereafter in a second rolling step passing the pair of current collectors and the independent sheet through a rolling machine.

5. A method of manufacturing plastic bonded electrodes and battery plates having a preselected porosity and being adapted for use in electrochemical power sources, wherein the electrodes and plates comprise an active mass which is reinforced by a porous plastic skeleton and a metallic current collector, comprising the steps of mixing a loose active mass, and a material made up of a plastic material and a pore forming agent in a first mixing step in a mixer, and in a subsequent, second mixing step adding a liquid plasticizing agent and mixing it with previously formed mixture to form a slightly wetted powder loose mixture, homogenizing the slightly wetted powder loose mixture, and thereafter rolling the slightly wetted powder loose mixture into sheet form onto the metallic collector at room temperature.

* * * * *